US012803004B2

(12) United States Patent
Kim et al.

(10) Patent No.: US 12,803,004 B2
(45) Date of Patent: Nov. 17, 2026

(54) CATALYST LAYER FOR FUEL CELL, MANUFACTURING METHOD THEREFOR, AND MEMBRANE-ELECTRODE ASSEMBLY AND FUEL CELL WHICH COMPRISE SAME

(71) Applicant: KOLON INDUSTRIES, INC., Seoul (KR)

(72) Inventors: Jung Ho Kim, Seoul (KR); Jun Young Kim, Seoul (KR); Gyong Bum Ko, Seoul (KR); Sang Il Lee, Seoul (KR); Kah Young Song, Seoul (KR); Dong Jun Cho, Seoul (KR); Nak Won Kong, Seoul (KR); Hyeong Su Kim, Seoul (KR); Kyoung Sik Nam, Seoul (KR); Ju Sung Lee, Seoul (KR); Chan Mi Park, Seoul (KR); Sun Young Jeong, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 729 days.

(21) Appl. No.: 18/250,841

(22) PCT Filed: Dec. 3, 2021

(86) PCT No.: PCT/KR2021/018237

§ 371 (c)(1),
(2) Date: Apr. 27, 2023

(87) PCT Pub. No.: WO2022/145771

PCT Pub. Date: Jul. 7, 2022

(65) Prior Publication Data

US 2023/0411633 A1 Dec. 21, 2023

(30) Foreign Application Priority Data

Dec. 31, 2020 (KR) ........................ 10-2020-0189933

(51) Int. Cl.
*H01M 4/88* (2006.01)
*H01M 4/92* (2006.01)
*H01M 8/1004* (2016.01)

(52) U.S. Cl.
CPC ....... *H01M 4/8828* (2013.01); *H01M 4/8892* (2013.01); *H01M 4/926* (2013.01); *H01M 8/1004* (2013.01)

(58) Field of Classification Search
CPC .. H01M 4/8828; H01M 4/8892; H01M 4/926; H01M 8/1004
See application file for complete search history.

(56) References Cited

U.S. PATENT DOCUMENTS

2004/0067407 A1 4/2004 Sompalli
2019/0245232 A1* 8/2019 Kim .......................... C09C 3/10

FOREIGN PATENT DOCUMENTS

CN 104584302 A 4/2015
EP 3734728 A 11/2020
(Continued)

OTHER PUBLICATIONS

English translation of JP Publication 2010-113949, May 2010.*
(Continued)

*Primary Examiner* — Brittany L Raymond
(74) *Attorney, Agent, or Firm* — Harvest IP Law, LLP

(57) ABSTRACT

The present invention relates to a catalyst layer for a fuel cell, a method for producing the catalyst layer, and a membrane-electrode assembly and a fuel cell including the catalyst layer. More particularly, the invention relates to a catalyst layer for a fuel cell, the catalyst layer including a catalyst, a heat dissipation material, and an ionomer and having an effect that the heat generated by an exothermic reaction in the catalyst layer can be efficiently discharged to the outside and a phenomenon of deterioration of a mem-
(Continued)

brane-electrode assembly caused by temperature increase in the catalyst layer can be suppressed; a method for producing the catalyst layer; and a membrane-electrode assembly and a fuel cell, both including the catalyst layer.

14 Claims, 4 Drawing Sheets

(56) References Cited

FOREIGN PATENT DOCUMENTS

| | | | | |
|---|---|---|---|---|
| JP | 2004111191 | A | | 4/2004 |
| JP | 2006019133 | A | | 1/2006 |
| JP | 2008-251549 | | * | 10/2008 |
| JP | 2008251549 | A | | 10/2008 |
| JP | 2008266586 | A | | 11/2008 |
| JP | 2010050048 | A | | 3/2010 |
| JP | 2010-113949 | | * | 5/2010 |
| JP | 2010113949 | A | | 5/2010 |
| JP | 2013-008562 | A | | 1/2013 |
| JP | 5581583 | B2 | | 9/2014 |
| JP | 2015-525301 | A | | 9/2015 |
| KR | 10-1724808 | B1 | | 4/2017 |
| KR | 20180076907 | A | | 7/2018 |
| KR | 10-1922636 | B1 | | 11/2018 |

OTHER PUBLICATIONS

English translation of JP Publication 2008-251549, Oct. 2008.*
The CN Office Action, dated Jun. 12, 2025.
EP Extended European Search Report, dated Jul. 8, 2025.
Office Action from Japanese Patent Office, dated Oct. 23, 2024.
The JP Office Action, dated May 2, 2024.

* cited by examiner

CATALYST LAYER FOR FUEL CELL, MANUFACTURING METHOD THEREFOR, AND MEMBRANE-ELECTRODE ASSEMBLY AND FUEL CELL WHICH COMPRISE SAME

TECHNICAL FIELD

The present application claims priority from Korean Patent Application No. 10-2020-0189933, filed on Dec. 31, 2020, the entire disclosure of which is incorporated herein by reference.

The present invention relates to a catalyst layer for a fuel cell, a method for producing the catalyst layer, and a membrane-electrode assembly and a fuel cell including the catalyst layer.

BACKGROUND ART

A fuel cell is a power generation system that converts the chemical reaction energy of hydrogen and oxygen contained in hydrocarbon-based substances such as methanol, ethanol, and natural gas, directly into electric energy. A representative example of such a fuel cell may be a Polymer Electrolyte Membrane Fuel Cell (PEMFC). The PEMFC is attracting attention as a next-generation energy source, and research for commercialization of PEMFC is in active progress particularly in the fields related to automobiles due to advantages such as environmental-friendly impression.

A Membrane-Electrode Assembly (MEA) that substantially generates electricity in the above-described fuel cell system has a structure in which an anode electrode (also referred to as a fuel electrode or an oxidation electrode) and a cathode electrode (also referred to as an air electrode or a reduction electrode) are disposed, with a polymer electrolyte membrane containing a hydrogen ion conductive polymer interposed therebetween. Each electrode is composed of a catalyst, an ionomer, a solvent, and additives, and the catalyst among the above-described constituent elements is an important factor that determines the activity and durability of the fuel cell.

DISCLOSURE OF INVENTION

Problem to be Solved by the Invention

An object of the present invention is to provide a catalyst layer of an electrode, which can suppress deterioration of a membrane-electrode assembly caused by an exothermic reaction occurring in the catalyst layer.

Another object of the present invention is to provide a membrane-electrode assembly including the above-described catalyst layer.

Still another object of the present invention is to provide a fuel cell including the above-described membrane-electrode assembly.

Still another object of the present invention is to provide a method for producing the above-described catalyst layer.

Means for Solving Problem

In order to achieve the above-described objects, a catalyst layer for a fuel cell according to an embodiment of the present invention includes a catalyst, a heat dissipation material, and an ionomer.

At this time, the catalyst may include a carrier and metal particles supported on the carrier.

The carrier may include any one or more selected from the group consisting of carbon black, Ketjen Black, porous carbon, carbon fiber, carbon nanotube, carbon nanohorn, and graphene.

The metal particles may include platinum or a platinum-based alloy.

The heat dissipation material may be randomly distributed within the catalyst layer while being adjacent to the catalyst.

The heat dissipation material may include any one or more selected from the group consisting of ceramic nanoparticles, an ultrahigh molecular weight polyethylene (UHMWPE), and polyacetylene.

The ceramic nanoparticles may include any one or more selected from the group consisting of boron nitride, aluminum nitride, aluminum oxide, silicon carbide, and beryllium oxide, and the average diameter of the ceramic nanoparticles may be 10 to 500 nm.

The thickness of the catalyst layer may be 1 to 15 μm.

A membrane-electrode assembly according to another embodiment of the present invention includes an anode electrode; a cathode electrode; and an ion exchange membrane disposed between the anode electrode and the cathode electrode, and one or more of the anode electrode and the cathode electrode includes the catalyst layer.

A fuel cell according to another embodiment of the present invention includes the above-described membrane-electrode assembly.

A method for producing a catalyst layer for a fuel cell according to another embodiment of the present invention includes a step of preparing an electrode slurry including a catalyst, a heat dissipation material, an ionomer, and a dispersion medium; a step of coating a base material with the electrode slurry to form a slurry layer; and a step of removing the dispersion medium from the slurry layer.

In the step of preparing an electrode slurry, a content of the dispersion medium may be 80% by weight to 95% by weight with respect to a total weight of the electrode slurry.

In the step of preparing an electrode slurry, a content of the heat dissipation material may be 0.1% to 15% by weight with respect to the total weight of the electrode slurry.

In the step of preparing an electrode slurry, a weight ratio of the catalyst and the heat dissipation material may be 5:1 to 20:1, and a weight ratio of the catalyst and the ionomer may be 10:1 to 2:3.

The step of preparing an electrode slurry includes a step of performing homogeneous mixing, and in the step of performing homogeneous mixing, mixing can be performed by using any one selected from the group consisting of a ball mill, a powder mixer, and a resonant acoustic mixer.

Effect of the Invention

As the catalyst layer of the present invention includes a heat dissipation material, the catalyst layer has an effect that the heat generated due to an exothermic reaction in the catalyst layer can be discharged to the outside, and a deterioration phenomenon of a membrane-electrode assembly caused by temperature increase in the catalyst layer can be suppressed.

BEST MODE(S) FOR CARRYING OUT THE INVENTION

Figure 1:
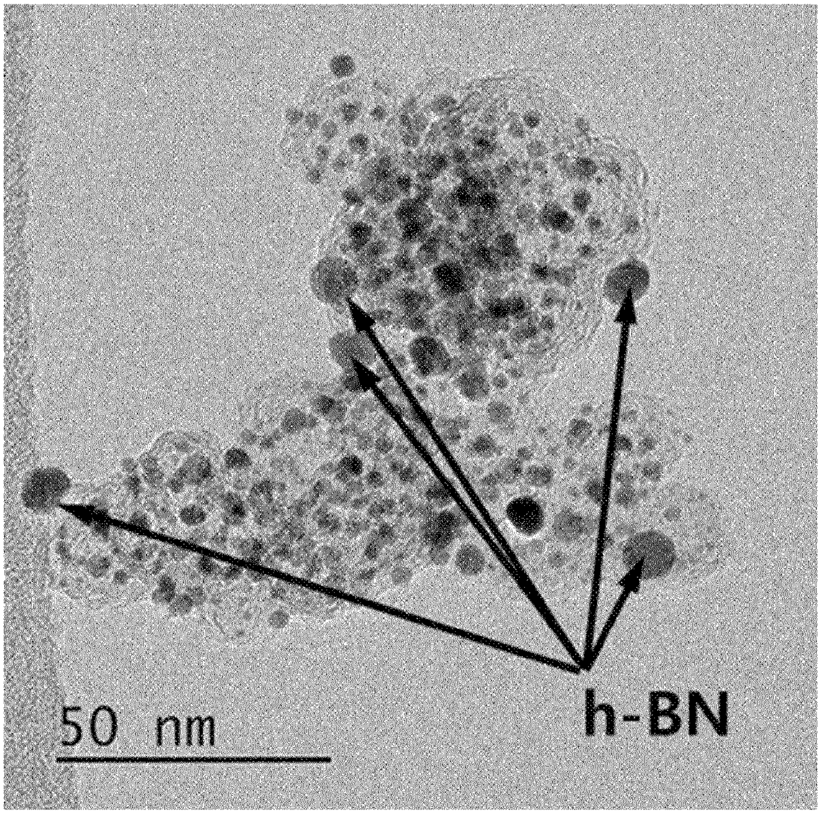
FIG. 1 is a TEM photograph of an electrode produced according to an embodiment of the present invention.

Hereinafter, the present invention will be described in more detail.

The summary of the present invention is intended to describe a general configuration within the scope of the present invention and is not intended to limit the scope of the present invention. Furthermore, the summary of the present invention is not intended to fully disclose the entirety or embodiments of the present invention.

The detailed description and specific embodiments of the present invention are intended to describe the present invention by disclosing the embodiments of the present invention and are not intended to limit the scope of the present invention. Furthermore, it should be noted that the various embodiments disclosed herein are not intended to exclude other embodiments having different features or other embodiments composed of combinations of embodiments having the disclosed features.

The term "preferred" or "preferably" as used in the present invention indicates embodiments of the present invention having specific advantages under specific conditions. However, other embodiments can also be preferred under the same conditions or under different conditions. Furthermore, it should be noted that description of one or more preferred embodiments is not intended to prove that other embodiments are not useful or to exclude other embodiments within the scope of the present invention.

The term "include" as used in the present specification is used to list materials, compositions, apparatus, and methods which are useful for the present invention and is not intended to limit the scope of the invention to the listed examples.

The catalyst layer for a fuel cell according to an embodiment of the present invention includes a catalyst, a heat dissipation material, and an ionomer.

The catalyst may include any of the metal particles that can be used as catalyst in a hydrogen oxidation reaction or an oxygen reduction reaction, and preferably, the catalyst can include a platinum-based metal. The platinum-based metal can include any one selected from the group consisting of platinum (Pt), palladium (Pd), ruthenium (Ru), iridium (Ir), osmium (Os), a platinum-M alloy (wherein M represents any one or more selected from the group consisting of palladium (Pd), ruthenium (Ru), iridium (Ir), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La), and rhodium (Rh)), and combinations of these. More preferably, a combination of two or more kinds of metals selected from the above-described platinum-based catalyst metal group can be used; however, the platinum-based metal is not limited to this, and any platinum-based catalyst metal that can be used in the technical field of the present invention can be used without limitation.

Examples of the platinum-based alloy include: (i) binary alloys such as Pt—Co, Pt—Pd, Pt—Mn, Pt—Sn, Pt—Mo, Pt—Cr, Pt—W, Pt—Ir, Pt—Ru, Pt—Ni, and Pt—Fe; (ii) ternary alloys such as Pt—Ru—W, Pt—Ru—Ni, Pt—Ru—Mo, Pt—Ru—Ir, Pt—Co—Mn, Pt—Co—Ni, Pt—Co—Fe, Pt—Co—Ir, Pt—Co—S, Pt—Co—P, Pt—Fe—Ir, Pt—Fe—S, Pt—Fe—P, Pt—Au—Co, Pt—Au—Fe, Pt—Au—Ni, Pt—Ni—Ir, and Pt—Cr—Ir; and (iii) quaternary alloys such as Pt—Ru—Rh—Ni, Pt—Ru—Sn—W, and Pt—Ru—Ir—Ni; however, the platinum-based alloy is not limited to these examples.

The metal particles of the catalyst and the heat dissipation material can be used in an unsupported state; however, when the metal particles of the catalyst are supported on a carrier, a decrease in the surface area caused by a phenomenon of agglomeration of the metal particles and the heat dissipation material can be prevented. Therefore, in the catalyst layer, the catalyst can include a carrier and metal particles supported on the carrier, and it is preferable that the heat dissipation material is randomly distributed in the catalyst layer while being adjacent to the catalyst, from the viewpoints of the catalyst efficiency of the catalyst layer and the heat dissipation efficiency of the heat dissipation material.

The carrier can be selected from porous inorganic oxides such as a carbon-based carrier, zirconia, alumina, titania, silica, and ceria; zeolites; and the like. The carbon-based carrier can be selected from Super P, carbon fiber, carbon sheet, carbon black, Ketjen Black, acetylene black, carbon nanotube (CNT), carbon sphere, carbon ribbon, fullerene, graphene, activated carbon, and combinations of one or more these; however, the carbon-based carrier is not limited to these, and any carrier that can be used in the technical field of the present invention can be used without limitation. Preferably, when the carrier includes one material selected from carbon black, Ketjen Black, carbon nanotube, and graphene as the carbon-based material, the carrier can assist in further facilitating electron exchange with the catalyst.

When the metal particles are supported on the carrier, it is preferable that the carrier has a specific surface area of 50 $m^2/g$ or more or 50 to 1200 $m^2/g$ and an average particle size of 10 to 300 nm or 20 to 200 nm, for the purpose of expressing an appropriate catalytic effect.

The catalyst metal particles supported on the carrier and the heat dissipation material may be located on the surface of the carrier or may be caused to penetrate into the carrier while filling the internal pores of the carrier.

The heat dissipation material assists in efficiently transferring the thermal energy generated by an exothermic reaction occurring on the catalyst surface to the outside of the catalyst layer. The heat dissipation material may specifically include any one or more selected from the group consisting of ceramic nanoparticles, ultrahigh molecular weight polyethylene (UHMWPE), and polyacetylene. Preferably, in the case of using polyacetylene, the heat dissipation function can be further enhanced when the heat dissipation material is used together with the above-described ceramic nanoparticles.

The ceramic nanoparticles may be specifically any one or more selected from the group consisting of boron nitride, aluminum nitride, aluminum oxide, silicon carbide, and beryllium oxide. The ceramic nanoparticles are supported on the carrier and increase the surface area of the catalyst layer, have excellent thermal conductivity, and have an effect of easily transferring heat to the outside of the catalyst layer and an effect of suppressing moisture evaporation within the catalyst layer. Therefore, the ceramic nanoparticles preferably have an average diameter of 10 to 500 nm, and when the average diameter is larger than the above-described range, an increase in the surface area caused by large particles is negligible so that there may be a problem that the heat dissipation effect is less likely to be imparted appropriately. When the average diameter is smaller than the above-described range, a phenomenon of agglomeration between the particles or in the vicinity of the catalyst, and the like may occur, and there may be a problem that the function of the catalyst is rather deteriorated.

Furthermore, the heat dissipation material to be used can include an ultrahigh molecular weight polyethylene (UHMWPE) having a weight average molecular weight (Mw) of 3,500,000 to 10,500,000. The UHMWPE is included in the catalyst layer and increases the tensile strength of the catalyst layer. The UHMWPE has water-repellent properties, plays a role of easily discharging the moisture generated in the catalyst layer to the outside, and also plays a role of rapidly transferring the heat produced in the catalyst layer to the outside through the long molecular chain.

When polyacetylene is included as the heat dissipation material, an excellent electrical conductive effect and a heat dissipation effect can be realized at the same time. Specifically, when the polyacetylene has a long molecular chain having a weight average molecular weight (Mw) of 20,000 to 1,000,000, it is advantageous for efficiently discharging the heat inside the catalyst layer; however, the weight average molecular weight is not limited to the above-described molecular weight.

The ionomer may be a cation conductor having a cation exchange group such as proton or may be an anion conductor having an anion exchange group such as hydroxy ion, carbonate ion, or bicarbonate ion. Regarding the ionomer, any ionomer that is generally used in fuel cells can be used.

The cation exchange group may be any one selected from the group consisting of a sulfonate group, a carboxyl group, a boronate group, a phosphate group, an imide group, a sulfonimide group, a sulfonamide group, and combinations of these, and the cation exchange group may be generally a sulfonate group or a carboxyl group.

The cation conductor includes the above-described cation exchange group, and examples include fluorine-based polymers containing fluorine in the main chain; hydrocarbon-based polymers such as benzimidazole, polyamide, polyamideimide, polyimide, polyacetal, polyethylene, polypropylene, acrylic resin, polyester, polysulfone, polyether, polyetherimide, polyester, polyethersulfone, polyetherimide, polycarbonate, polystyrene, polyphenylene sulfide, polyether ether ketone, polyether ketone, polyarylether sulfone, polyphosphazene, and polyphenylquinoxaline; partially fluorinated polymers such as polystyrene-graft-ethylenetetrafluoroethylene copolymer and a polystyrene-graft-polytetrafluoroethylene copolymer; and sulfonimide.

More specifically, when the cation conductor is a hydrogen ion cation conductor, the above-described polymers can include a cation exchange group selected from the group consisting of a sulfonate group, a carboxylate group, a phosphate group, a phosphonate group, and derivatives thereof in a side chain, and specific examples thereof include, but are not limited to, fluorine-based polymers including poly(perfluorosulfonic acid), poly(perfluorocarboxylic acid), a copolymer of tetrafluoroethylene and fluorovinylether containing a sulfonic acid group, defluorinated sulfurized polyether ketone, and mixtures of these; and hydrocarbon-based polymers including sulfonated polyimide (S—PI), sulfonated polyarylether sulfone (S-PAES), sulfonateed polyether ether ketone (SPEEK), sulfonated polybenzimidazole (SPBI), sulfonated polysulfone (S—PSU), sulfonated polystyrene (S—PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylenesulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, polyarylene ether sulfone ketone, and mixtures of these.

Furthermore, in the cation conductor, H in a cation exchange group at the end of a side chain may be substituted with Na, K, Li, Cs, or tetrabutylammonium. When H in the cation exchange group at the end of a side chain is substituted with Na, the substitution can be achieved by using NaOH during the production of a carbon structure composition, and when the H is substituted with tetrabutylammonium, substitution can be achieved by using tetrabutylammonium hydroxide. K, Li, or Cs can also be substituted by using appropriate compounds. The above-described substitution method is well known in the pertinent art, and therefore, detailed description will not be repeated in the present specification.

The cation conductor can be used in the form of a single substance or a mixture, and for the purpose of selectively further improving the adhesive strength to an ion exchange membrane, the cation conductor may also be used together with a non-conductive compound. Regarding the amount of use of the cation conductor, it is preferable that the cation conductor is used after regulating the amount of use to be suitable for the purpose of use.

As the non-conductive compound, any one or more selected from the group consisting of polytetrafluoroethylene (PTFE), a tetrafluoroethylene-hexafluoropropylene copolymer (FEP), a tetrafluoroethylene-perfluoroalkyl vinyl ether copolymer (PFA), ethylene/tetrafluoroethylene (ETFE), an ethylene-chlorotrifluoroethylene copolymer (ECTFE), polyvinylidene fluoride, a copolymer of polyvinylidene fluoride-hexafluoropropylene (PVdF-HFP), dodecylbenzenesulfonic acid, and sorbitol, can be used.

The anion conductor is a polymer capable of transporting anions such as hydroxy ion, carbonate ion, or bicarbonate ion. The anion conductor is commercially available in the form of hydroxide or halide (generally, chloride), and the anion conductor can be used for industrial water purification, metal separation, carbon structure processes, and the like.

As the anion conductor, a polymer doped with a metal hydroxide can be generally used, and specifically, poly(ether sulfone), polystyrene, a vinyl-based polymer, poly(vinyl chloride), poly(vinylidene fluoride), poly(tetrafluoroethylene), poly(benzimidazole), poly(ethylene glycol), and the like, all of which are doped with metal hydroxides, can be used.

Among the above-described ionomers, a fluorine-based polymer is preferably used. The fluorine-based polymer may be, for example, a perfluorosulfonic acid (PFSA)-based polymer or a perfluorocarboxylic acid (PFCA)-based polymer; however, the fluorine-based polymer is not limited to these. Regarding the perfluorosulfonic acid-based polymer, Nafion (DuPont de Nemours, Inc.) can be used, and regarding the perfluorocarboxylic acid-based polymer, Flemion (Asahi Glass Co., Ltd.) can be used.

The weight average molecular weight of the ionomer may be 240 g/mol to 200,000 g/mol, and specifically 240 g/mol to 10,000 g/mol.

The thickness of the catalyst layer according to an embodiment of the present invention is 1 to 15 μm. When the thickness of the catalyst layer is small compared with the above-described range, there may be a problem that durability of the catalyst layer is significantly deteriorated. When the thickness of the catalyst layer is large compared with the above-described range, there may be a problem that mass transfer of the catalyst layer is reduced so that performance is deteriorated, or the thickness of the fuel cell becomes thicker.

A membrane-electrode assembly according to an embodiment of the present invention includes an anode electrode and a cathode electrode disposed to face each other, and an ion exchange membrane disposed between the anode electrode and the cathode electrode, and any one selected from the group consisting of the anode electrode, the cathode electrode, and both the electrodes includes the above-described catalyst layer for a fuel cell as an electrode catalyst layer.

Figure 3:
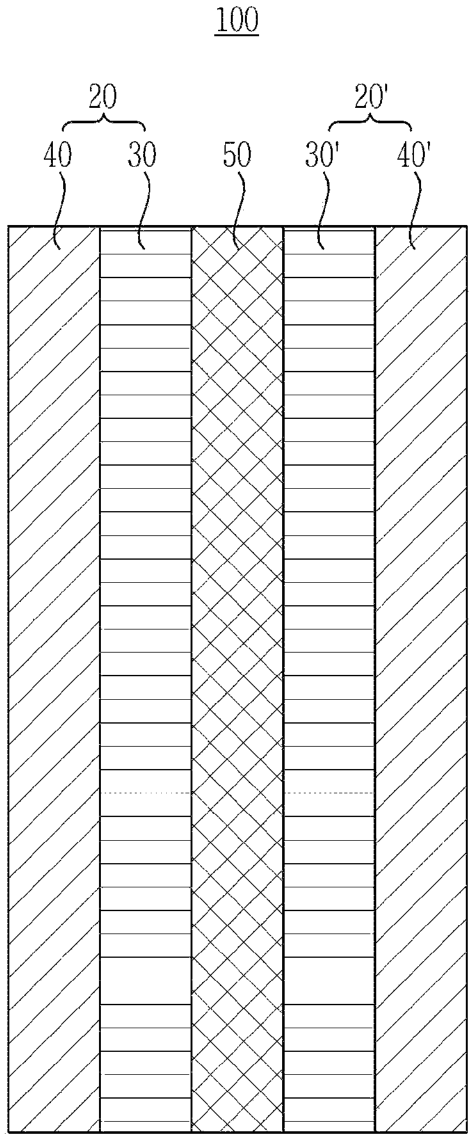
FIG. 3 is a cross-sectional view schematically illustrating a membrane-electrode assembly according to an embodiment of the present invention.

FIG. 3 is a cross-sectional view schematically showing the above-described membrane-electrode assembly. To describe with reference to FIG. 3, the membrane-electrode assembly (100) includes the above-described ion exchange membrane (50) and the above-described electrodes (20, 20') that are disposed on both surfaces of the ion exchange membrane (50), respectively. An electrode (20, 20') includes an electrode base material (40, 40') and a catalyst layer (30, 30') formed on the surface of the electrode base material (40, 40'), and a microporous layer (not shown in the diagram) containing conductive microparticles such as carbon powder or carbon black may be further included between the electrode base material (40, 40') and the catalyst layer (30, 30') in order to facilitate mass diffusion at the electrode base material (40, 40').

In the membrane-electrode assembly (100), an electrode (20) that is disposed on one surface of the ion exchange membrane (50) and causes an oxidation reaction for producing hydrogen ions and electrons from a fuel transferred through the base material (40) to the catalyst layer (30), is referred to as anode electrode, and an electrode (20') that is disposed on the other surface of the ion exchange membrane (50) and causes a reduction reaction for producing water from the hydrogen ions supplied through the ion exchange membrane (50) and an oxidizing agent transferred through the electrode base material (40') to the catalyst layer (30'), is referred to as cathode electrode.

The catalyst layer (30, 30') of any one electrode (20, 20') selected from the anode electrode (20), the cathode electrode (20'), and both of these includes the electrode according to an embodiment of the present invention described above.

As the electrode base material (40, 40'), a porous conductive base material can be used so that smooth supply of hydrogen or oxygen can be achieved. Representative examples thereof that can be used include carbon paper, carbon cloth, carbon felt, and metal cloth (a porous film composed of a metal cloth in the form of textile, or a product in which a metal film is formed on the surface of cloth formed from polymer fibers); however, the electrode base material is not limited to these. Furthermore, regarding the electrode base material (40, 40'), it is preferable to use an electrode base material that has been subjected to water repellency treatment with a fluorine-based resin because a decrease in the efficiency of reactant diffusion caused by the water generated during operation of the fuel cell can be prevented. As the fluorine-based resin, polytetrafluoroethylene, polyvinylidene fluoride, polyhexafluoropropylene, polyperfluoroalkyl vinyl ether, polyperfluorosulfonyl fluoride alkoxyvinyl ether, fluorinated ethylene propylene, polychlorotrifluoroethylene, or copolymers of these can be used.

The fuel cell according to an embodiment of the present invention may be a fuel cell that includes the above-described membrane-electrode assembly and uses, for example, hydrogen gas as a fuel.

Figure 4:
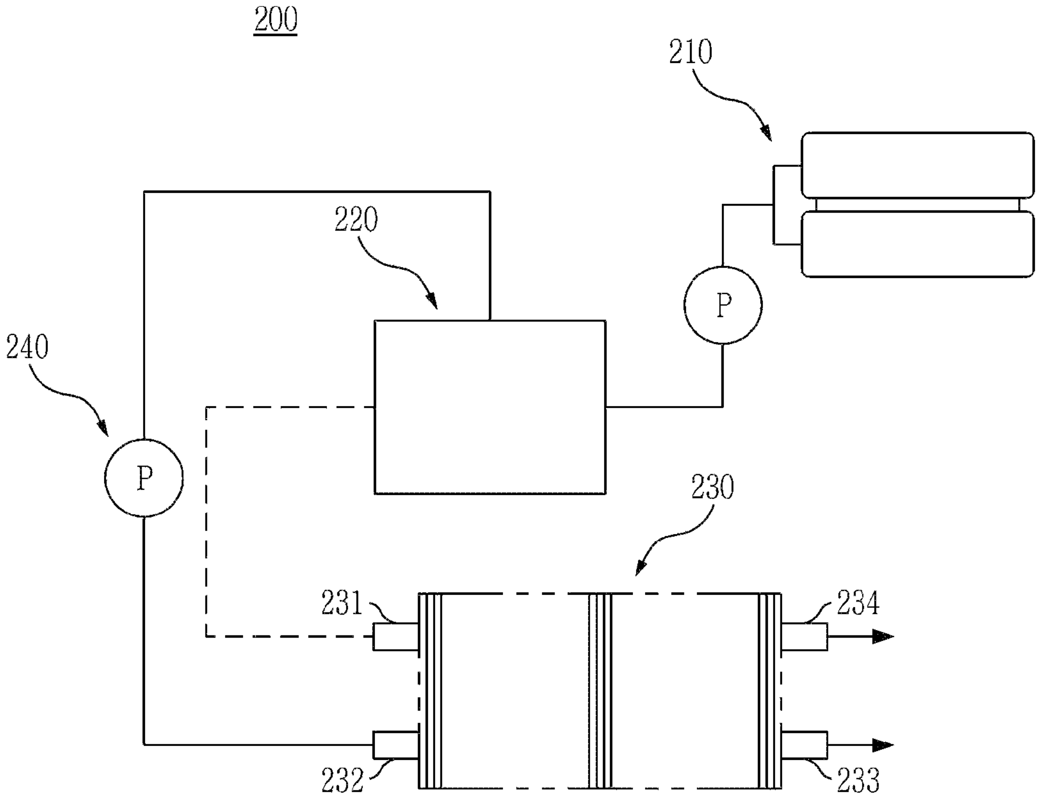
FIG. 4 is a schematic diagram illustrating the overall configuration of a fuel cell according to an embodiment of the present invention.

FIG. 4 is a schematic diagram illustrating the overall configuration of the fuel cell.

Referring to the FIG. 4, the fuel cell (200) includes a fuel supply unit (210) that supplies a mixed fuel obtained by mixing fuel and water; a reforming unit (220) that reforms the mixed fuel to generate a reformed gas including hydrogen gas; a stack (230) in which the reformed gas including hydrogen gas supplied from the reforming unit (220) causes an electrochemical reaction with an oxidizing agent and generates electric energy; and an oxidizing agent supply unit (240) that supplies an oxidizing agent to the reforming unit (220) and the stack (230).

The stack (230) includes a plurality of unit cells that induce oxidation/reduction reaction of a reformed gas including hydrogen gas supplied from the reforming unit (220) and an oxidizing agent supplied from the oxidizing agent supply unit (240) and generate electric energy.

Each unit cell means a unit cell that generates electricity, and a unit cell may include: the above-described membrane-electrode assembly that oxidizes/reduces the reformed gas including hydrogen gas and oxygen in the oxidizing agent; and a separating plate (also referred to as bipolar plate; hereinafter, referred to as "separating plate") for supplying the reformed gas including hydrogen gas and an oxidizing agent to the membrane-electrode assembly. The separating plate is disposed on both sides of the membrane-electrode assembly at the center. At this time, the separating plates disposed on the respective outermost sides of the stack may be specially referred to as end plates.

One of the end plates among the separating plates may be equipped with a pipe-shaped first supply tube (231) for injecting the reformed gas including hydrogen gas that is supplied from the reforming unit (220), and a pipe-shaped second supply tube (232) for injecting oxygen gas, while the other end plate may be equipped with a first discharge tube (233) for discharging the reformed gas including hydrogen gas that finally remains unreacted in a plurality of unit cells to the outside, and a second discharge tube (234) for discharging the oxidizing agent that finally remains unreacted in the above-described unit cells to the outside.

A method for producing a catalyst layer according to an embodiment of the present invention includes: a step of preparing an electrode slurry including a catalyst, a heat dissipation material, an ionomer, and a dispersion medium; a step of coating the electrode slurry on a base material to form a slurry layer; and a step of removing the dispersion medium from the slurry layer.

According to an embodiment of the present specification, the dispersion medium may be a solvent selected from the group consisting of water, a hydrophilic solvent, an organic solvent, and a mixture of one or more of these.

The hydrophilic solvent may be a solvent having one or more functional group selected from the group consisting of an alcohol containing a linear or branched saturated or unsaturated hydrocarbon having 1 to 12 carbon atoms, a ketone, an aldehyde, a carbonate, a carboxylate, a carboxylic acid, an ether, and an amide, and these may contain an aliphatic or aromatic cyclic compound in at least a portion of the main chain. Specific examples of the alcohol include methanol, ethanol, isopropyl alcohol, ethoxyethanol, n-propyl alcohol, butyl alcohol, 1,2-propanediol, 1-pentanol, 1,5-pentanediol, and 1,9-nonanediol; examples of the ketone include heptanone and octanone; examples of the aldehyde include benzaldehyde and tolualdehyde; the ester may be methyl pentanoate or ethyl-2-hydroxypropanoate; examples of an ester include methyl pentanoate and ethyl-2-hydroxypropanoate; examples of the carboxylic acid include pentanoic acid and heptanoic acid; examples of the ether include methoxybenzene and dimethoxypropane; and examples of the amide include propanamide, butylamide, and dimethylacetamide.

The organic solvent can be selected from N-methylpyrrolidone, dimethyl sulfoxide, tetrahydrofuran, and mixtures of these.

In the step of preparing an electrode slurry, the dispersion medium can be incorporated at a proportion of 80% by weight to 95% by weight with respect to the total weight of the electrode slurry. When the proportion is less than 80% by weight, the solid content may be too high, and there may be problems of cracking at the time of electrode coating and poor dispersion caused by high viscosity. When the proportion is more than 95% by weight, the electrode activity may be disadvantageous.

In the step of preparing an electrode slurry, the content of the heat dissipation material is preferably 0.1% to 15% by weight with respect to the total weight of the electrode slurry. When the content of the heat dissipation material is less than 0.1% by weight with respect to the total weight of the electrode slurry, there may be a problem that the heat dissipation material cannot easily accomplish a heat dissipation function effectively, and when the content of the heat dissipation material is more than 15% by weight with respect to the total weight of the electrode slurry, there may be problems such as that the catalyst is enclosed by the heat dissipation material having poor electrical conductivity, or the ionomer surrounds the heat dissipation material instead of the catalyst so that a chemical reaction cannot occur smoothly on the catalyst surface, which causes an increase in the electrical resistance of the catalyst layer.

Furthermore, in the step of preparing an electrode slurry, it is preferable that the heat dissipation material has a weight smaller than that of the catalyst in the relationship with the catalyst in the aspect of efficiency of the catalyst, and more specifically, the weight ratio of the catalyst and the heat dissipation material is preferably 5:1 to 20:1. When the proportion of the heat dissipation material is high as compared to the above-described weight range, the amount of the catalyst is small, and the fuel cell performance may be deteriorated. When the proportion of the heat dissipation material is low as compared to the above-described weight range, there may be a problem that the heat generated by the catalyst cannot be effectively discharged to the outside.

In the step of preparing an electrode slurry, the weight ratio of the catalyst and the ionomer is preferably 10:1 to 2:3; however, the weight ratio is not limited to this. When the content of the ionomer is smaller than the above-described range relative to the catalyst, there may be a problem that ion transfer to the electrolyte membrane is not achieved appropriately, and when the content of the ionomer is larger than the above-described range relative to the catalyst, there may be a problem that permeation of gases is blocked and the performance of the membrane-electrode assembly is deteriorated.

The step of preparing an electrode slurry includes a step of performing homogeneous mixing, and in the step of performing homogeneous mixing, mixing can be carried out by using any one selected from the group consisting of a ball mill, a powder mixer, and a resonant acoustic mixer. Homogenous mixing of a catalyst slurry including the catalyst, heat dissipation material, ionomer, and dispersion medium can be performed by using any one selected from the group consisting of a ball mill, a powder mixer, and a resonant acoustic mixer, and preferably, mixing can be performed by using a homogeneous mixer and a resonant acoustic mixer in combination. Specifically, the resonant acoustic mixer performs resonant vibratory mixing by applying low-frequency acoustic energy to the catalyst slurry composition.

For instance, when a resonant acoustic mixer of Resodyn Corporation is used, the acoustic energy is applied by periodic linear displacement of a vessel filled with the catalyst slurry composition, and for this purpose, an arrangement of a large number of mechanical or electronic transducer is used. More specifically, the resonant acoustic mixer includes an oscillator drive that transfers vibration and acceleration to the vessel; and a variable elastic member such as a spring.

The resonant vibratory mixing can be conducted for 30 seconds to 30 minutes, and can be conducted specifically for a short period of time of 1 minute to 10 minutes. When the time for resonant vibratory mixing is less than 30 seconds, mixing may be insufficiently achieved, or the coating characteristics may not be confirmed. When the time for resonant vibratory mixing is more than 30 minutes, the sample or the composition may change.

According to a specific embodiment of the step of producing a catalyst layer, the electrode slurry is coated on a base material to form a slurry layer. When the electrode slurry is coated on the base material, it is preferable that the electrode slurry composition is continuously or intermittently transported to a coater and then uniformly applied on the base material so as to obtain a dried thickness of 1 to 15 lam.

More particularly, the electrode slurry composition is continuously transported to a coater such as a die coater, a gravure coater, a bar coater, or a comma coater through a pump depending on the viscosity of the electrode slurry composition, and then the transported electrode slurry composition is uniformly applied on a decal film by using methods such as slot die coating, bar coating, comma coating, screen printing, spray coating, doctor blade coating, and brushing, so as to obtain a dried thickness of the catalyst layer of 1 μm to 15 μm. The applied electrode slurry composition is passed through a drying furnace maintained at a constant temperature so that the dispersion medium is evaporated.

When the slurry layer is coated to a thickness of less than 1 μm, the catalyst content may be small, and the activity may be lowered. When the slurry layer is coated to a thickness of more than 15 μm, mass transfer of ions and electrons may not be smooth, and resistance may be increased, while performance is deteriorated.

The drying step may involve drying at 25° C. to 1200° C. for 12 hours or longer. When the drying temperature is below 25° C. and the drying time is less than 12 hours, there may be a problem that a sufficiently dried catalyst layer cannot be formed. When drying is performed at a temperature exceeding 120° C., cracking or the like of the catalyst layer may occur.

However, the methods for applying and drying the electrode slurry are not limited to the above-described methods.

Selectively, after the step of drying the slurry layer to produce a catalyst layer, a step of cutting the dried catalyst layer and the base material into a necessary size and joining the layers with an ion exchange membrane may be further included.

The type of the catalyst, the type of the heat dissipation material, and the proportions of the compositions have been described above, and any portion of the steps can be carried out according to general methods for forming a catalyst layer.

In the following description, specific Examples of the present invention will be proposed. However, the Examples described below are only for specifically illustrating or explaining the present invention and are not intended to limit the present invention. Furthermore, any contents that are not described herein can be sufficiently technically conjectured by those ordinarily skilled in the art, and further description thereof will not be repeated here.

Production Example: Production of Catalyst Layer Including Heat Dissipation Material

Example 1) 9 g of a platinum catalyst and 1 g of boron nitride (h-BN) as a heat dissipation material were dispersed in a mixed solution of water and N-propanol.
2) 40 g of a 10% PFSA ionomer (EW725, S.M. Chemical Supplies Co., Ltd.) solution and a mixed catalyst slurry were added to a solution in which the catalyst and the heat dissipation material were dispersed, and the mixture was treated for 5 minutes with a resonant acoustic mixer and then dispersed for 30 minutes with a homogeneous mixer to produce a homogenously mixed catalyst slurry.
3) The catalyst slurry was cast as a catalyst layer on a PTFE film with a doctor blade on a horizontal plate of an applicator in a clean bench and then dried for 3 minutes at 60° C. to finally produce the catalyst layer.

Comparative Example

A catalyst layer was produced in the same manner as in the Example, except that a heat dissipation material was not added, and 10 g of a platinum catalyst was dispersed in a mixed solution of water and N-propanol.

Experimental Example: Evaluation of Physical Properties of Catalyst Layer

FIG. 1 is a photograph, taken by transmission electron microscopy (TEM), of the catalyst layer of the Example produced through the Production Example, and it can be confirmed from FIG. 1 that a heat dissipation material (h-BN) is distributed in the vicinity of the catalyst, while an ionomer surrounds this. It can be seen from this that the heat dissipation material is randomly distributed in the vicinity of the catalyst layer.

Figure 2:
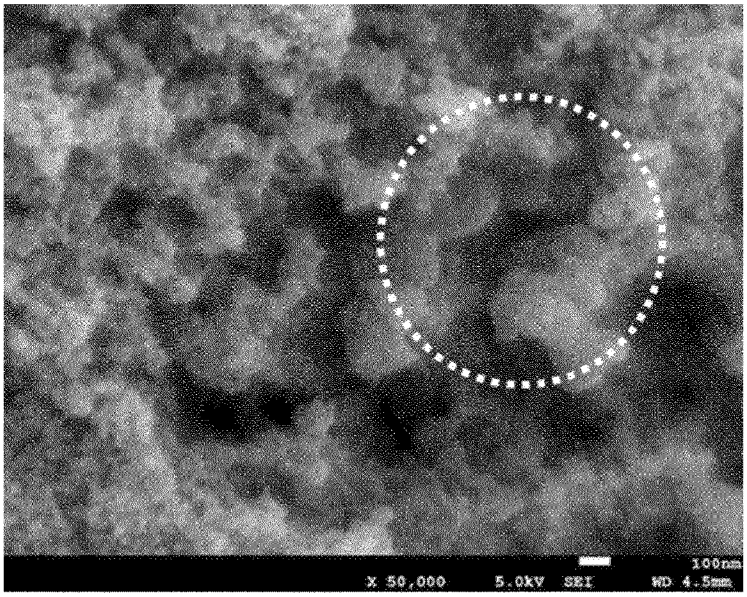
FIG. 2 is a SEM photograph of an electrode produced according to an embodiment of the present invention.

FIG. 2 is a result obtained by performing a SEM cross-sectional analysis of a membrane-electrode assembly produced after the electrode including a catalyst layer of the Example including the heat dissipation material is coated on a release film. Most of the heat dissipation material randomly exists in the form of particles, and agglomerates of particles are also present. In FIG. 2, the heat dissipation material part of the catalyst layer is indicated with a circle, and it could be confirmed from this that a portion of the heat dissipation material was present inside the electrode layer.

During high-temperature operation of a fuel cell, the reaction heat of the fuel cell, an increase in the amount of radical produced, an increase in the size of the catalyst, and corrosion of the carrier occur.

Figure 5:
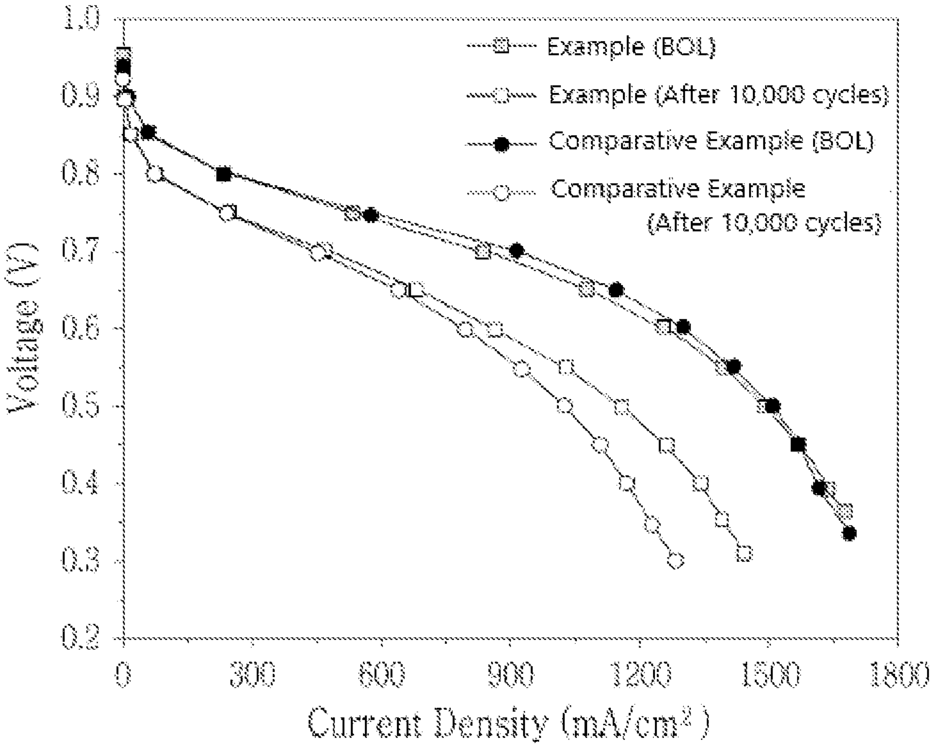
FIG. 5 shows the evaluation results for catalyst durability according to Examples and Comparative Examples of the present invention.

FIG. 5 is a graph obtained by evaluating the durability of membrane-electrode assemblies including the catalyst layers of the Example and the Comparative Example produced in the Production Example described above by using the DOE (US Department of Energy) catalyst durability evaluation protocol, the graph showing the initial performance (BOL) and the performance after 10,000 cycles of the membrane-electrode assemblies including the Example.

Referring to FIG. 5, it could be confirmed that an electrode (Example) to which the heat dissipation material according to the Example of the present invention was added, effectively discharged the heat inside the cell and exhibited excellent durability performance after 10,000 cycles.

Preferred embodiments of the present invention have been described in detail above; however, the scope of rights of the present invention is not limited to these, and it should be noted that various modifications and improvements made by an ordinarily skilled person using the basic concept of the present invention as defined in the following claims are also included in the scope of rights of the present invention.

EXPLANATIONS OF LETTERS OR NUMERALS

20, 20': ELECTRODE
30, 30': CATALYST LAYER
40, 40': ELECTRODE BASE MATERIAL
50: ION EXCHANGE MEMBRANE
100: MEMBRANE-ELECTRODE ASSEMBLY
200: FUEL CELL
210: FUEL SUPPLY UNIT
220: REFORMING UNIT
230: STACK
231: FIRST SUPPLY TUBE
232: SECOND SUPPLY TUBE
233: FIRST DISCHARGE TUBE
234: SECOND DISCHARGE TUBE
240: OXIDIZING AGENT SUPPLY UNIT

The invention claimed is:

1. A catalyst layer for a fuel cell, the catalyst layer comprising:
- a catalyst including a carrier and metal particles supported on the carrier;
- a heat dissipation material without supported metal particles; and
- an ionomer,
- wherein a weight proportion of the heat dissipation material is smaller than a weight proportion of the catalyst,
- wherein the weight ratio of the catalyst and the heat dissipation material is 5:1 to 20:1,
- wherein the heat dissipation material is boron nitride.

2. The catalyst layer for a fuel cell according to claim 1, wherein the heat dissipation material is disposed on the carrier surface of the catalyst.

3. The catalyst layer for a fuel cell according to claim 1, wherein the carrier includes any one or more selected from the group consisting of carbon black, Ketjen Black, porous carbon, carbon fiber, carbon nanotube, carbon nanohorn, and graphene.

4. The catalyst layer for a fuel cell according to claim 1, wherein the heat dissipation material has a smaller size than the carrier of the catalyst.

5. The catalyst layer for a fuel cell according to claim 1, wherein the heat dissipation material is randomly distributed within the catalyst layer while being adjacent to the catalyst.

6. The catalyst layer for a fuel cell according to claim 1, wherein boron nitride has an average diameter of 10 to 500 nm.

7. The catalyst layer for a fuel cell according to claim 1, wherein the catalyst layer has a thickness of 1 to 15 μm.

8. A membrane-electrode assembly comprising:

an anode electrode;

a cathode electrode; and an ion exchange membrane disposed between the anode electrode and the cathode electrode, wherein one or more of the anode electrode and the cathode electrode includes the catalyst layer according to claim 1.

9. A fuel cell comprising the membrane-electrode assembly according to claim 8.

10. A method for producing a catalyst layer for a fuel cell, the method comprising:

a step of preparing an electrode slurry including a catalyst including a carrier and metal particles supported on the carrier, a heat dissipation material without supported metal particles, an ionomer, and a dispersion medium;

a step of coating the electrode slurry on a base material to form a slurry layer; and a step of removing the dispersion medium from the slurry layer, wherein a weight proportion of the heat dissipation material is smaller than a weight proportion of the catalyst, wherein in the step of preparing an electrode slurry, a weight ratio of the catalyst and the heat dissipation material is 5:1 to 20:1, wherein the heat dissipation material is boron nitride.

11. The method for producing a catalyst layer for a fuel cell according to claim 10, wherein in the step of preparing an electrode slurry, a content of the dispersion medium is 80% by weight to 95% by weight with respect to the total weight of the electrode slurry.

12. The method for producing a catalyst layer for a fuel cell according to claim 10, wherein in the step of preparing an electrode slurry, a content of the heat dissipation material is 0.1% to 15% by weight with respect to the total weight of the electrode slurry.

13. The method for producing a catalyst layer for a fuel cell according to claim 10, wherein in the step of preparing an electrode slurry, a weight ratio of the catalyst and the ionomer is 10:1 to 2:3.

14. The method for producing a catalyst layer for a fuel cell according to claim 10, wherein the step of preparing an electrode slurry includes a step of performing homogeneous mixing, and in the step of performing homogeneous mixing, mixing is performed by using any one selected from the group consisting of a ball mill, a powder mixer, and a resonant acoustic mixer.

* * * * *